United States Patent [19] [11] 4,054,771
Foulquier et al. [45] Oct. 18, 1977

[54] DEVICE FOR ELECTRONIC BEAM WELDING OF COAXIAL CYLINDRICAL SLEEVES PLACED IN END-TO-END RELATION

[75] Inventors: Henri Foulquier, La Celle St.-Cloud; Philippe Martin, Orsay, both of France

[73] Assignee: Commissariat a l'Energie Atomique, Paris, France

[21] Appl. No.: 646,549

[22] Filed: Jan. 5, 1976

[30] Foreign Application Priority Data

Jan. 16, 1975 France .................. 75.01302

[51] Int. Cl.² .................. B23K 9/00
[52] U.S. Cl. .................. 219/121 EB; 219/121 EM; 219/60 A; 219/59; 228/45
[58] Field of Search .................. 219/59, 60 R, 60 A, 219/121 EB, 121 EM, 125 PL; 228/45

[56] References Cited

U.S. PATENT DOCUMENTS

| | | | |
|---|---|---|---|
| 3,102,187 | 8/1963 | Coscia | 219/60 A |
| 3,268,707 | 8/1966 | Thomas | 219/60 A X |
| 3,483,352 | 12/1969 | Schollhammer | 219/60 A X |
| 3,535,489 | 10/1970 | Hinrichs | 219/121 EB |
| 3,604,612 | 9/1971 | Miller et al. | 228/45 |
| 3,609,275 | 9/1971 | Roberts et al. | 219/60 A |
| 3,719,791 | 3/1973 | Peyrot | 219/121 EB |
| 3,767,890 | 10/1973 | Madden, Jr. | 219/60 A X |
| 3,783,223 | 1/1974 | Gwin et al. | 219/60 A |
| 3,873,798 | 3/1975 | Friedman et al. | 219/60 A |

FOREIGN PATENT DOCUMENTS 816,843  7/1959  United Kingdom .............. 219/60 R

*Primary Examiner*—Bruce A. Reynolds
*Assistant Examiner*—Mark H. Paschall
*Attorney, Agent, or Firm*—William D. Stokes

[57] ABSTRACT

An electron gun which is displaced on a carriage relatively to two abutting cylindrical sleeves is guided so as to produce an electron beam which travels along the line of junction, the carriage being housed within a vacuum-tight enclosure which is applied against the sleeves on each side of the junction line. The cylindrical sleeves are supported and displaced in rotation about a horizontal axis with an equal range of motion and at a speed of opposite sign with respect to the linear speed of the carriage. The carriage thus remains motionless in a position such that the electron beam is continuously vertical.

35 Claims, 8 Drawing Figures

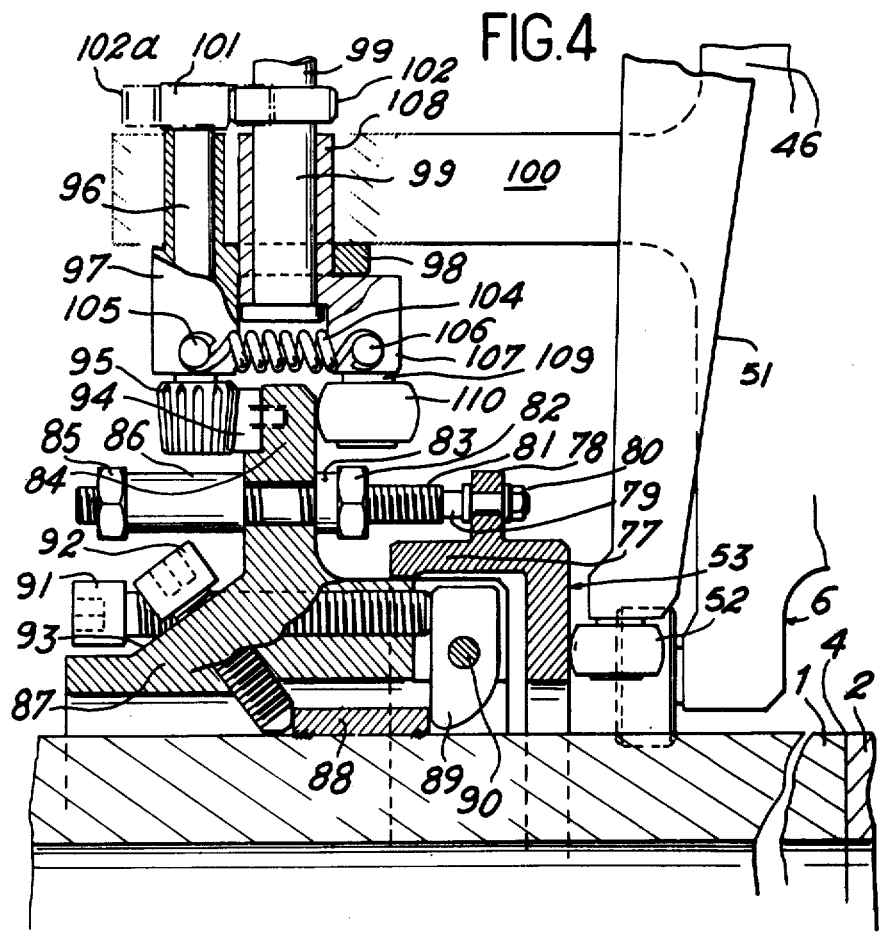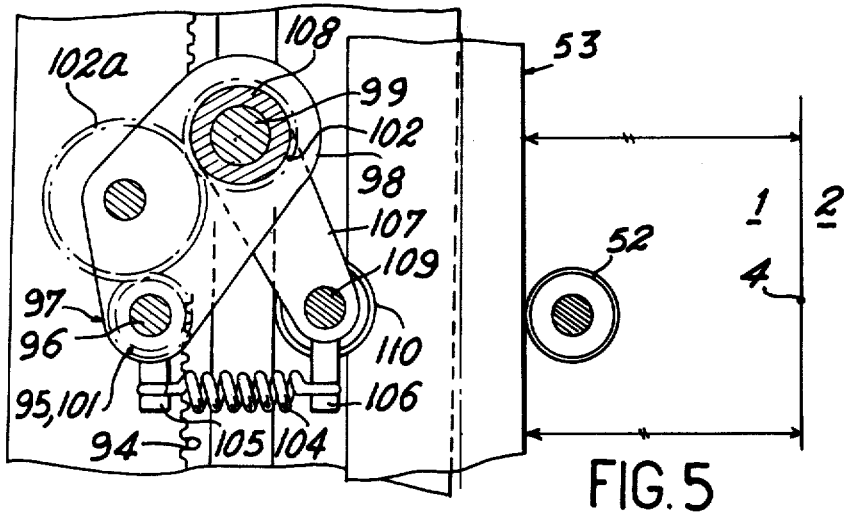

DEVICE FOR ELECTRONIC BEAM WELDING OF COAXIAL CYLINDRICAL SLEEVES PLACED IN END-TO-END RELATION

This invention relates to a device for welding two cylindrical sleeves in end-to-end relation by means of the beam produced by an electron gun within a vacuum enclosure which surrounds the weld zone at the point of junction of the two sleeves.

A device for welding massive parts as already described in particular in U.S. Pat. No. 3,463,899 filed Apr. 6, 1967 comprises an electron gun mounted on a movable support which permits the displacement of said gun with respect to the weld seam to be formed. This is achieved in particular by guiding the electron gun with respect to a surface which is machined in one of the parts or added thereto. The weld line, the electron gun and its movable support are located within a vacuum enclosure which is intended to bear on the parts to be welded without surrounding them completely and does not have any rigid connection with the gun so as to permit the free displacement of this latter. The procedure involved in an arrangement of this type consists in transmitting the necessary motion to the electron gun support in order to ensure that the weld seam to be formed within the enclosure is followed exactly by the electron gun with reference to the surface which has previously been machined on one of the parts. An enclosed space is intended to be isolated between said enclosure and the walls of the parts against which it is applied, with the result that the vacuum conditions which are essential to the operation of the electron gun can readily be established within said space.

However, in the event that the parts to be welded are cylindrical sleeves of large diameter which have to be joined together in end-to-end relation and also have a considerable thickness within the range of a few tens of millimeters to a few tens of centimeters, it is essential to ensure that the weld metal which is melted under the action of the electron beam produced by the gun remains continuously in the vertical or practically vertical position so that the molten weld metal does not spread outside the weld groove or does not solidify within this latter in a non-homogeneous manner. In consequence, the electron beam itself must remain vertical and the gun from which the beam emerges must therefore be stationarily fixed in position. On the other hand the cylindrical sleeves are capable of moving with respect to said electron gun and endowed with a movement of rotation about their common axis which is located horizontally so that the seam to be welded at the point of junction of the two sleeves can be passed in front of the beam of the electron gun.

Under these conditions, the invention relates to an improvement made in the arrangements covered by the patent cited earlier so that the characteristics of the installation described may be utilized by adapting them to the end-to-end welding of two cylindrical sleeves of appreciable thickness which are mounted so as to have a horizontal axis and driven in rotation about said axis, the welded joint being formed by means of an electron gun which is maintained stationary so as to deliver a beam which remains continuously vertical.

To this end, the device under consideration essentially comprises in combination a supporting carriage for an electron gun so arranged that an electron beam produced by said gun strikes the surface of said cylindrical sleeves along their line of junction, means for producing the relative displacement of said carriage with respect to said cylindrical sleeves, a member for adjustably positioning said carriage with respect to a reference mark carried by the surface of at least one of said cylindrical sleeves and extending parallel to said line of junction for guiding said electron gun, an enclosure applied against said cylindrical sleeves on each side of the line of junction thereof and delimiting therewith a sealed evacuated chamber which contains said carriage, means for supporting said cylindrical sleeves with their common axis located horizontally and means for displacing said sleeves in rotation about said axis with an equal range of travel and at a speed of opposite sign to that of said carriage with respect to said cylindrical sleeves so that said carriage remains motionless within the space in a position which is chosen so as to ensure that the electron beam produced is continuously vertical.

In a preferred embodiment of the invention in which the electron gun support carriage is placed outside said cylindrical sleeves, the enclosure which delimits the vacuum chamber is constituted by two annular half-shells pivoted to each other about an axis which is parallel to the axis of said cylindrical sleeves and so arranged as to surround the external surface of said sleeves, each half-shell being such as to have a generally U-shaped cross-section in which the extremities of the two arms each have a channel for accommodating at least one seal which is applied against the surface of said cylindrical sleeves.

In order to close the vacuum chamber, the enclosure is advantageously associated with a shaped cylindrical metallic strip which is mounted according to requirements either externally or internally of said cylindrical sleeves opposite to said enclosure beneath the line of junction of said sleeves. Said shaped metallic strip can be constituted by a cylindrical ring which is secured against the cylindrical sleeves in vacuum-tight manner. By way of alternative, the edges of said shaped strip are applied in vacuum-tight manner against said cylindrical sleeves on each side of said junction and has a central portion located at a distance from said sleeves.

In accordance with a particular feature of the device under consideration, said supporting carriage comprises a frame carried by at least one wheel applied against the surface of said cylindrical sleeves and a support bracket which is rigidly fixed to said frame and on which is pivotally mounted a vacuum-tight casing, said casing being intended to carry on the one hand said electron gun and on the other hand a diffusion pump for creating a vacuum within said gun by means of a communication established through said casing. By way of alternative, said wheel can be associated with a mechanism for the height adjustment of said frame.

The member for positioning said electron gun is constituted in particular by a curved guide bar which extends parallel to said line of junction between said cylindrical sleeves and against which is applied a spring-loaded roller, said roller being freely mounted at the extremity of an arm which is rigidly fixed to said casing so as to ensure that the electron beam is continuously maintained substantially in the plane of said line of junction.

Depending on requirements, said curved guide bar is welded against the surface of one of said cylindrical sleeves or is carried by a stationary guide rail which is rigidly fixed to one of said sleeves by means of transverse threaded rods each adapted to cooperate with a nut and a lock-nut so as to permit accurate adjustment of said guide bar and consequently of said electron beam, starting from the aproximately parallel position of said rail with respect to said line of junction.

In accordance with a particular feature, said guide rail has a circular transverse cross-section and cooperates with a least one waisted driving pinion carried by the frame of said carriage and driven by a first drive motor so as to carry out the relative movement of displacement of said carriage with respect to said rail. By way of alternative, said guide rail is provided on one of its faces with a set of teeth in cooperating relation with a driving bevel pinion. Said frame preferably has a substantially horizontal flat flange traversed by a perpendicular pin on which is pivotally mounted a floating device having two arms in which one arm is fitted with at least one roller applied against said rail and the other arm supports said driving pinion, said two arms being continuously urged against said rail by a transverse spring so as to ensure that the positioning of said carriage with respect to said line of junction is not modified by any possible misalignment of said rail. In accordance with yet another characteristic feature, said guide rail is mounted on the surface of one of said cylindrical sleeves by means of studs which are located at uniform intervals on said sleeve and serve as anchoring points for said rail.

The cables and ducts for supplying the electron gun are advantageously connected on the one hand to said gun on the supporting carriage and on the other hand to a collar which provides a lead-out connection from said enclosure which surrounds said cylindrical sleeves. Said cables and ducts have a length within the interior of said enclosure which is slightly greater than the half-circumference of one of said sleeves and are carried by an articulated chain which extends within said enclosure on an annular guide which is supported by said cylindrical sleeve.

In accordance with another particular feature of the device under consideration, the means for supporting said cylindrical sleeves so that these latter have a horizontal common axis are constituted by a rotator provided with cradles on which the cylindrical sleeves are supported by means of bearing rollers, at least one of said rollers being driven by a second drive motor for the rotation of said cylindrical sleeves, said second motor and said first motor which drive the pinion carried by said carriage and adapted to cooperate with said set of teeth on said guide rail having directions of rotation and speeds such that the linear speed of the carriage is equal to and of opposite sign with respect to the speed of a point of the circumference of the cylindrical sleeves. The first and second motors are preferably synchronous motors.

Finally and in a further alternative embodiment, the electron gun support carriage can be placed within the interior of the cylindrical sleeves. In this case, the enclosure is provided with parallel circular side plates which can be mounted within the interior of the cylindrical sleeves on each side of the line of junction of said sleeves, one of said side plates being traversed by a cylindrical tube which is coaxial with said sleeves and constitutes the supporting carriage for said electron gun, vacuum-tightness between the tube and the side plate being ensured by means of at least one sliding annular seal carried by said tube and applied against said side plate or conversely.

Further properties of a welding device constructed in accordance with the invention will become apparent from the following description of one exemplified embodiment given hereinafter by way of indication and not in any limiting sense, reference being made to the accompanying drawings, in which:

FIGS. 4 and 5 illustrate to an even larger scale constructional details of the device for positioning the electron gun support carriage and of the means employed for carrying out the relative displacement of this latter with respect to the cylindrical sleeves;

Figure 1:
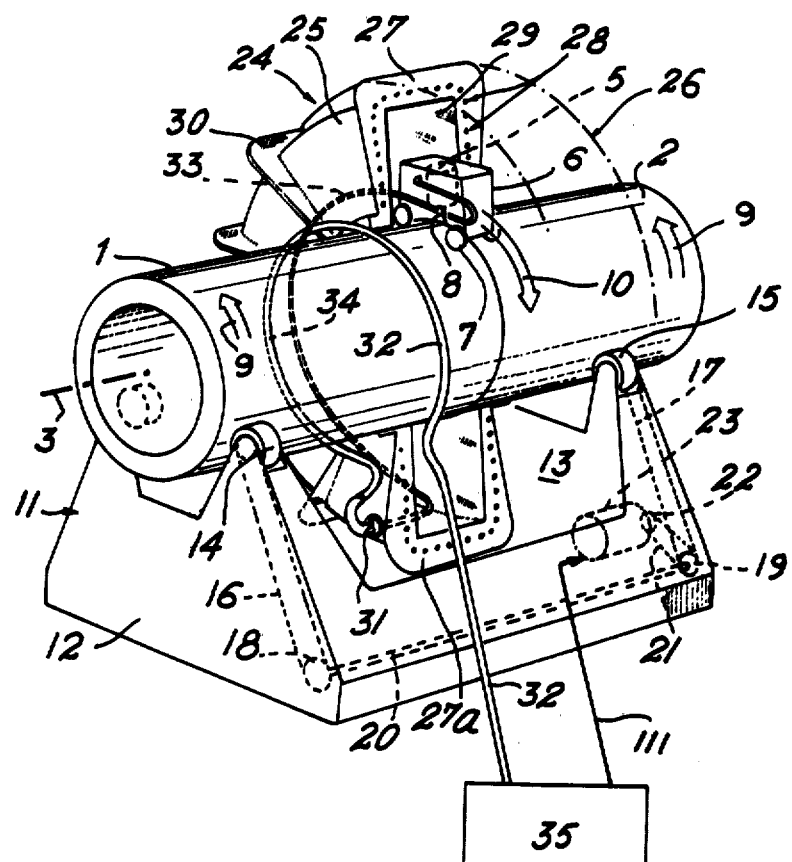
FIG. 1 is a diagrammatic view in perspective showing the welding device under consideration and illustrating in particular the relative positions of the cylindrical sleeves to be welded, of the electron gun and of the enclosure which surrounds said gun.

The device shown in FIG. 1 is designed to make a welded joint between two coaxial cylindrical sleeves 1 and 2 respectively which are disposed with a horizontal common axis represented diagrammatically by the chain-dotted line 3. Said cylindrical sleeves have an appreciable thickness which can vary between a few millimeters and a few tens of centimeters and have diametral dimensions which can attain several meters, the means of practical application of the device being in any case not limited by the dimensions of the cylindrical sleeves. The placing of the two cylindrical sleeves 1 and 2 in end-to-end relation thus defines a line of junction 4 which extends substantially in a vertical plane and along which the welding operation is to be performed, expecially by the electronic bombardment technique, by means of an electron gun designated in FIG. 1 by the reference 5. Said electron gun is carried by a supporting carriage 6 which rests on the external surface of the cylindrical sleeves 1 and 2 by means of wheels 7 so as to permit a relative displacement of said electron gun with respect to the cylindrical sleeves and thus to ensure that the electron beam 8 produced by the gun is capable of describing the line of junction 4 which remains continuously vertical or practically vertical. This is intended to ensure the formation of a high-quality weld without any running of the molten weld metal as the cylindrical sleeves are moved with respect to the gun. To this end, the cylindrical sleeves 1 and 2 are both endowed simultaneously with a movement of rotation about their horizontal axis 3 in the direction of the arrow 9, for example, whilst the electron gun 5 which is carried by its supporting carriage 6 is in turn subjected with respect to the cylindrical sleeves to a movement having the same amplitude but in the opposite direction, namely in the direction of the arrow 10. The electron gun 5 thus remains motionless with the substantially vertical electron space 8.

In order to produce the movement of rotation of the cylindrical sleeves 1 and 2 in the manner which has been indicated above, these latter rest on a rotator 11 which is provided in particular with two vertical end cradles 12 and 13, said cradles being designed to carry bearing and driving rollers 14 and 15. Said rollers are coupled by means of motion-transmission systems 16 and 17 such as chains, belts or the like to pulleys 18 and 19 fixed on a common horizontal driving shaft 20. The pulley 19 is in turn driven by a chain 21 actuated by a driving wheel 22 which is fixed on the output shaft of a motor 23.

In order to ensure that the vacuum conditions required for the production of the electron beam are established around the electron gun 5, especially in the region surrounding the junction line 4 between the two cylindrical sleeves 1 and 2, said sleeves which are driven by the rotator 11 are associated with a vacuum-tight outer enclosure 24 which is applied against the external surface of said cylindrical sleeves in the example of construction which is more especially considered. Said enclosure 24 is advantageously formed by two identical shells each having the shape of a half-torus which surrounds the cylindrical sleeves, said shells being designated in FIG. 1 by the references 25 and 26, the second shell 26 being indicated only partially in chain-dotted outline in order to simplify the drawing. These two shells are intended to be applied against each other by means of two end-flanges 27 and 27a which are coupled together by means of bolts 28. Said shells thus delimit with the external wall of the cylindrical sleeves a chamber 29 which extends around the junction line 4 and within which moves the electron gun 5 carried by its supporting carriage 6. The enclosure 24 is in fact rigidly fixed to the cylindrical sleeves 1 and 2 by means described hereinafter and rotates with said sleeves while moving with respect to the electron gun. A suitable vacuum is produced within the chamber 29 by external pumping means (not shown in the drawings). The mechanical resistance of the shells 25 and 26 with respect to the pressure difference exerted between the interior and the exterior of the enclosure is ensured by means of lateral stiffening webs 30.

Provision is made on one of the shells of the enclosure 24, for example on the shell 25, for a lead-out collar 31 for a cable 32 containing all the electrical leads and the coolant fluid ducts which are necessary for the operation of the electron gun 5 and the displacement of the supporting carriage 6, especially the high-voltage supply of the electron gun, the low-voltage supply of the magnetic lens of this latter and the supply to the isolating electrovalve. Said cable thus has a portion 33 which is located inside the chamber 29 and a portion 34 located outside this latter after being passed through the collar 31. The portion 34 advantageously forms one idle turn around the cylindrical sleeve 1 so as to permit the free unwinding of this latter at the time of rotation of the two cylindrical sleeves 1 and 2 on the rotator 11. On the other hand, the portion 33 is connected to the electron gun 5 by making use of unwinding means, the constructional detail of which will be explained hereinafter, especially with reference to FIGS. 2 and 7. Finally, the cable 32 is connected externally of the enclosure 24 to a general control desk 35 which permits remote control of the installation by grouping together all the operating information and the control and safety means.

Figure 2:
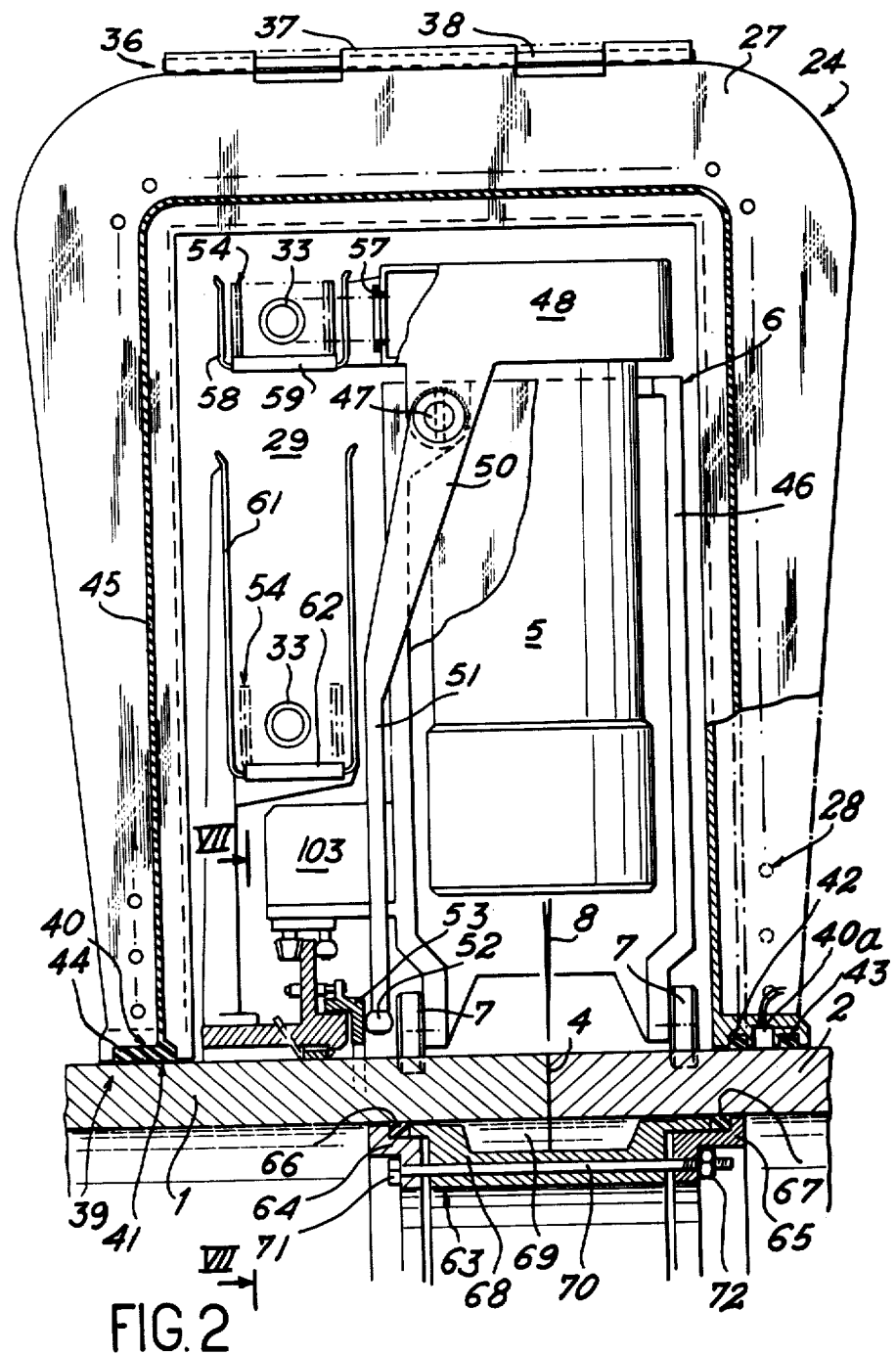
FIG. 2 is a partial transverse sectional view to a larger scale, this view being taken along a vertical plane which passes through the horizontal axis of the cylindrical sleeves.

FIG. 2 is a partial view to a larger scale showing the vacuum-tight enclosure 24 and the electron gun 5 which is mounted within the interior of this latter in order to carry out the welding of the cylindrical sleeves 1 and 2 along their line of junction 4. The two shells which constitute the enclosure (only the shell 25 being visible in the sectional view of FIG. 2) are pivoted to each other about a hinge 36 provided with hooks 37 and a horizontal hinge-pin 38. Each shell aforesaid has a U-shaped cross-section in which the extremities 39 of the U are intended to rest on the external surface of the cylindrical sleeves 1 and 2 on each side of the line 4. Each extremity aforesaid is provided with an annular internal channel 40 for accommodating a seal 41 advantageously constituted by two O-ring seals 42 and 43 which surround the external wall of the cylindrical sleeves. At the level of the coupling flanges 27 shown in the left-hand portion of FIG. 2, said seals 42 and 43 are joined together by means of a transverse tongue 44 having an extension in the form of an arch 45 which extends in the plane of said flanges in order to ensure that, when the assembly of the two shells has been completed, vacuum-tightness of the chamber 29 is ensured both between the extremities 39 of the shells and the wall of the cylindrical sleeves and between the two shells themselves. The seals 42, 43 and 45 are preferably made from a thermoplastic resin which is injected under pressure into the channel 40 prior to positioning of the shells around the cylindrical sleeves. In that portion of the shells which extends on each side of the coupling flanges 27, the two O-ring seals 42 and 43 are advantageously separated by a chamber 40a which is maintained at a negative pressure having an intermediate value between the pressure prevailing within the chamber 29 and the pressure outside the enclosure in order to perform the function of a buffer space.

The electron gun 5 is supported on the carriage 6 by means of a bracket 46 on which is provided a horizontal pivot-pin 47, there being pivotally mounted on said pin a vacuum-tight casing 48 which is connected on the one hand to the vacuum enclosure of the electron gun and on the other hand (as shown in FIG. 5) to a secondary vacuum pump 49 which communicates with the electron gun enclosure through said casing 48. This latter is provided with an arm 50 terminating in a rod 51 on the end of which is fitted a roller 52 designed to form a feeler and capable of cooperating with the lateral face of a curved guide bar 53 carried by one of the cylindrical sleeves and disposed in a plane which is strictly parallel to the plane of the junction line 4. The result thereby achieved is that the motion of the roller on the guide bar ensures a limited pivotal motion of the casing 48 about the pin 47 and adjusts the positioning of the electron beam 8 with respect to the junction line 4.

The electron gun 5 carried by the casing 48 on the carriage 6 is supplied by the cable 32, the portion 33 of which penetrates into the interior of the chamber 29. Unwinding of the cable at the time of displacement of the cylindrical sleeves with respect to the electron gun is carried out by supporting said cable by means of a chain 54 (shown in FIG. 7) formed of links 55 which are joined together one after the other by means of connecting articulations 56. The extremity of the portion 33 of the cable is connected to the casing 48 by means of a connecting collar 57 and is then supported by a trough 58 fitted with conveying rollers 59 (as shown in FIG. 2). The cable which leaves the casing forms at the outlet of the trough 58 a loop 60 (as shown in FIG. 7), then comes to rest within a second trough 61 (FIG. 2) which is fitted with conveying rollers 62 and serves to guide the cable within the chamber 29 up to the lead-out collar 31.

Figure 3:
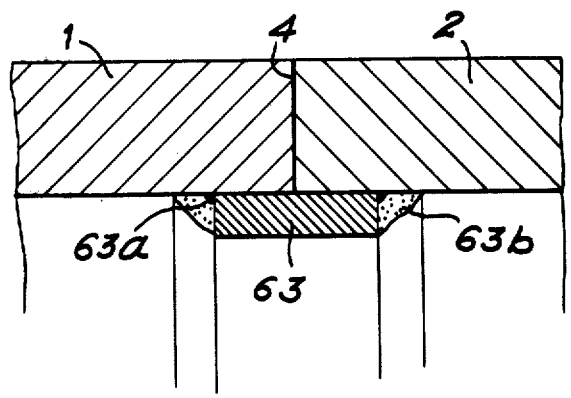
FIG. 3 shows an alternative form of a detail of FIG. 2.

Vacuum-tightness of the chamber 29 formed externally of the cylindrical sleeves 1 and 2 by means of the vacuum-tight outer enclosure 24 is completed towards the interior of said sleeves by mounting within these latter a shaped strip 63 which is located opposite to the junction line 4. In a first alternative embodiment in which the welding operation to be performed is carried out in particular in a number of welding passes, said shaped strip is constituted (as shown in FIG. 2) by two lateral shoes 64 and 65 which compress two annular seals 66 and 67. Said seals are applied against the internal surface of the cylindrical sleeves 1 and 2 with respect to a central member 68, a hollow portion 69 being formed in the central region of said member beneath the junction line 4 in order to create a vacuum within said hollow portion. The shoes 64, 65 and the member 68 are connected together by means of rods 70 each having a head 71 applied against one of the shoes and a nut 72 which is tightened on the opposite end so as to lock the components in position and to permit compression of the seals 66 and 67 against the surface of the cylindrical sleeves. In another alternative embodiment which is illustrated in FIG. 3, the shaped strip 63 is formed by a simple metallic ring consisting of one or a number of parts and applied against the cylindrical sleeves 1 and 2 opposite to the junction line 4. Said shaped strip is spot-welded at 63a, vacuum-tightness being achieved by injecting seals of thermosetting resin 63b. This solution makes it possible to prevent any possible running of the molten weld metal along the junction line, especially when the weld is performed in a single pass. After welding, the shaped strip is removed, the surface of the cylindricl sleeves is finished by means of a suitable machining operation of known type.

Figure 7:
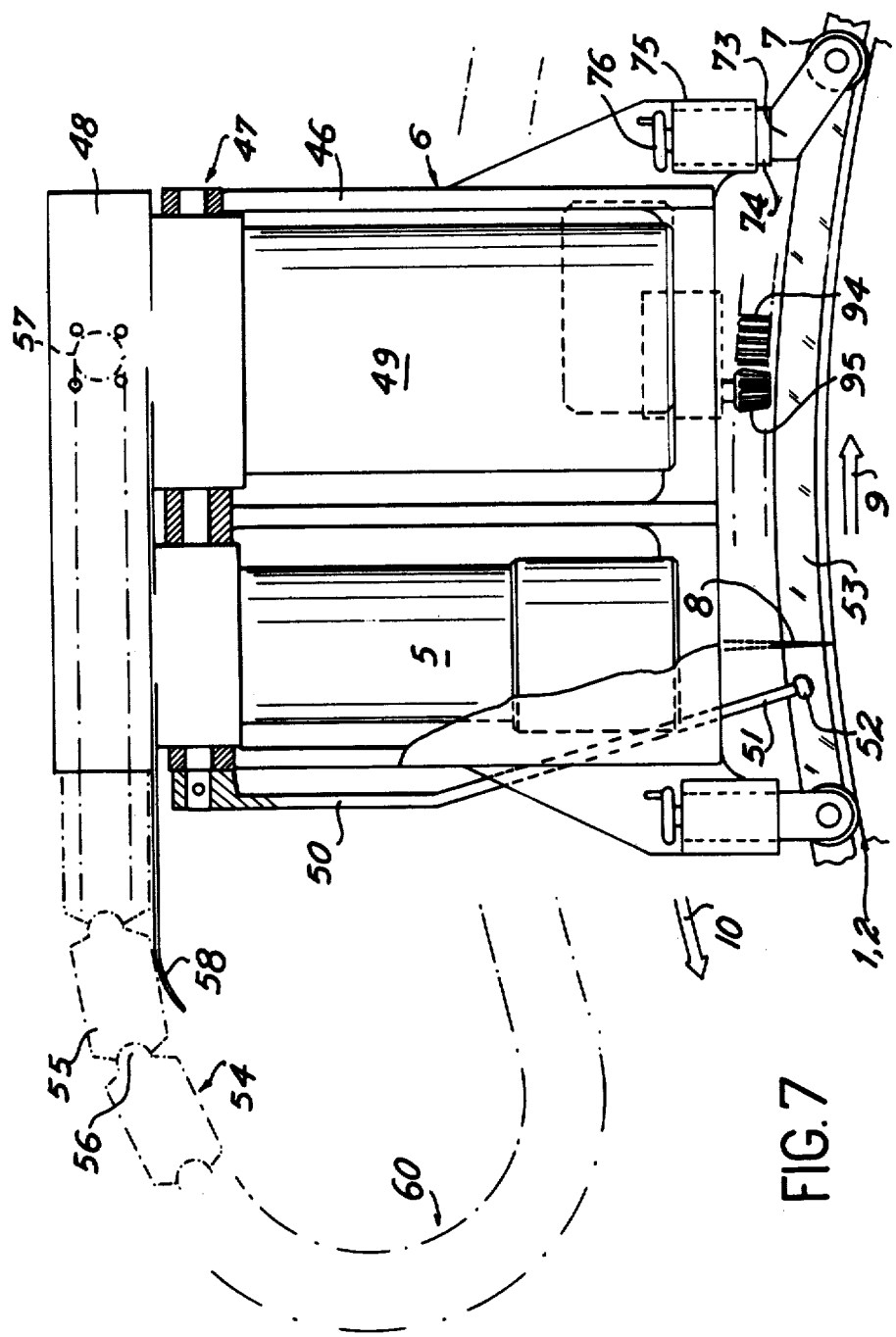
FIG. 7 is a sectional view along line VII—VII of FIG. 2 and showing the supporting carriage, this view being taken along a vertical plane at right angles to the axis of the cylindrical sleeves.

The carriage 6 which supports the electron gun 5 rests on the external surface of the cylindrical sleeves 1 and 2 by means of wheels 7 (as shown in FIG. 7). In the alternative embodiment which is illustrated, said wheels are associated with a height-adjustment device for adjusting the position of the electron gun with respect to the line of junction 4. To this end, each wheel of the carriage is carried by a fork 73 extended by a threaded rod 74 which cooperates with a supporting sleeve 75 by means of an operating hand-wheel 76 for varying the height of the wheel with respect to the carriage frame. It is readily apparent that any other equivalent mechanical arrangement for carrying out the height adjustment of the carriage 6 could be employed. By way of alternative, the carriage could be provided with only one bearing wheel whilst the other points of support are provided by the driving means which will be described hereinafter and cooperate with the support of the curved guide bar 53.

Guiding of said carriage 6 with respect to the cylindrical sleeves when these latter perform relative movements of rotation in opposite directions as shown by the arrows 9 and 10 is in fact carried out as already mentioned by means of said curved guide bar 53 in cooperating relation with the roller 52. FIGS. 4 and 5 accordingly illustrate in greater detail an alternative form of construction of the system employed for ensuring accurate positioning of said guide bar and for permitting displacement of the carriage with respect to the cylindrical sleeves at the same time.

The curved guide bar 53 which has an L-shaped cross-section has a cylindrical portion 77 which is substantially coaxial with one of the cylindrical sleeves and a vertical extension 78. Said vertical extension serves to associate the curved guide bar with a series of adjusting screws 79 which are locked in position with respect to the guide bar by means of nuts 80. Each screw has a threaded portion 81 which cooperates with a nut 82 and a bearing collar 83 which serves to adjust the transverse position of said screw with respect to a rail 84 which extends around the cylindrical sleeve 1 in a substantially vertical plane. The final position of the screw 79 is determined by a lock-nut 85 and a second bearing collar 86 The transverse displacement of the screw 79 and consequently of the curved guide bar 53 is thus adjusted with respect to the rail 84 by producing simultaneous action on the nuts 82 and 85. By virtue of these arrangements, the rail 84 can be mounted and fixed on the external surface of the cylindrical sleeve which supports said rail with a relatively low degree of accuracy. On the other hand, it is possible to achieve very fine positional adjustment of the curved guide bar 53 which controls the position of the electron beam with respect to the line of junction 4. The rail 84 is supported on the surface of the cylindrical sleeve 1 by a base 93 which is stationarily fixed by means of studs 88 which have previously been welded to the surface of said cylindrical sleeve at intervals. By way of example, positional locking of the base with respect to said studs is obtained on the one hand by means of a shoe 89 which is pivotally mounted on the base at 90 and cooperates with a screw 91 and on the other hand by means of screws 92 which pass through an inclined portion of the base 93 and are applied against each stud. In this case also, it is apparent that any other equivalent mechanical means could be contemplated for positioning and fixing the rail on the cylindrical sleeve.

In order to initiate the relative displacement of the carriage 6 with respect to the cylindrical sleeves 1 and 2, the rail 84 can be provided in one of its faces and in accordance with a first embodiment with a toothed rack 94 (as shown in FIG. 5) which is capble of cooperating with a driving pinion 95. Said pinion is mounted at the extremity of a vertical shaft 96 (FIG. 4) carried by a transverse oscillating arm 97 having a shoulder 98 traversed by a shaft 99 which is parallel to the shaft 96. Said shaft 99 is carried by a transverse flange 100 of the support bracket 46 of the carriage 6 and said flange extends horizontally above the cylindrical sleeve 1. At the end remote from the pinion 95, the shaft 96 is fitted with a second pinion 101 disposed in meshing engagement with an intermediate pinion 102a and this latter is in turn engaged with a driving pinion 102 which is keyed on the shaft 99 and driven by a motor 103 (as shown in FIG. 2). The arm 97 which is pivotally mounted on the shaft 99 is therefore capable of continuously following the rail 84 while maintaining the pinion 95 engaged with the toothed rack 94 even in the event of effective surface flatness or misalignment of said rail. As an advantageous feature, the pinion 95 is urged against the toothed rack by a spring 104, said spring being attached at one end to a stud 105 which is rigidly fixed to the arm 97 and at the other end to another stud 106 fixed on a second arm 107 which is also pivotally mounted on the shaft 99 of the transverse flange 100 by means of a coaxial bushing 108. At least one bearing roller 110 is freely mounted on the arm 107 about a shaft 109 and applied against the rail 84 on the side remote from the pinion 95 which is engaged with the toothed rack 94 or on each side of this latter if provision is made for a plurality of rollers. The two arms 97 and 107 thus form a floating assembly of the pincers type about the shaft 99, the driving pinion 95 and the roller 110 being continuously urged against the corresponding faces of the rail 84 by means of the spring 104.

Figure 6:
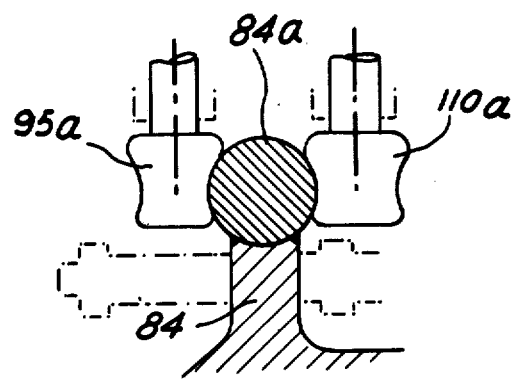
FIG. 6 shows an alternative form of construction of the means for displacing the carriage.

In another alternative embodiment which is illustrated in FIG. 6, the rail 84 is provided at the upper end thereof with an extension 84a which has a circular cross-section and is capable of cooperating with at least one waisted driving pinion 95a, said pinion being associated on the other face of the rail with waisted driving rollers 110a. The floating system formed by the pinion and roller assembly is naturally retained in this solution, thus making it unnecessary to provide for a circular toothed rack which is usually difficult to machine.

Figure 8:
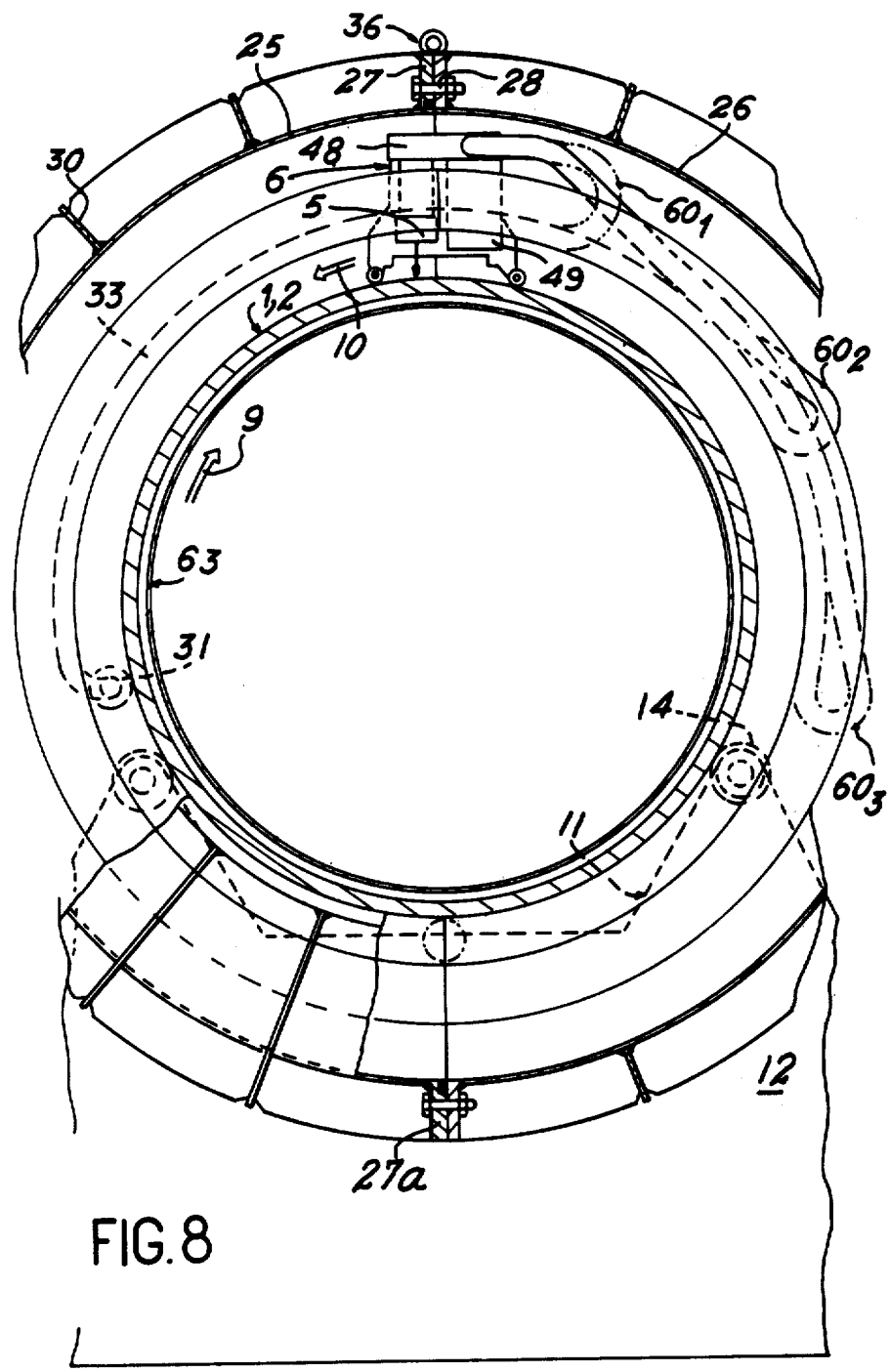
FIG. 8 is an end view of the cylindrical sleeves and of the enclosure which is associated therewith.

Finally, FIG. 8 provides a more detailed explanatory illustration of the operation of the welding device under consideration, especially for the purpose of joining the two cylindrical sleeves 1 and 2 along their line of junction 4. Initially, the supporting carriage 6 of the electron gun 5 is placed in position on the external surface of the cylindrical sleeves 1 and 2, these latter being partially positioned on the rotator 11. The position of the electron gun is adjusted at the outset so as to ensure that the electron beam 8 to be produced by this latter is perfectly vertical and opposite to the line 4. The curved guide bar 53 is adjusted with respect to the rail 84 so as to be located in a plane which remains continuously parallel to that of the line 4. The enclosure 24 is then mounted on the cylindrical sleeves at the same time as the internal shaped strip 63 so as to isolate the chamber 29, vacuum-tightness of said chamber being ensured by means of the seals 42, 43 and 45. The portion 33 of the cable 32 is connected to the electron gun 5 and the portion 34 of said cable is connected to the control desk 35. Said cable is guided by the troughs 58 and 61 which extend within the chamber 29 over slightly more than one half-circumference around the cylindrical sleeves in order to permit partial overlapping of the welding passes along the line 4. At the outset, the supporting carriage 6 is at the highest point of the cylindrical sleeves whilst the beam 8 is vertical.

Starting from this position, the motors 23 and 103 are endowed with movements having a direction and speed such that the carriage 6 which supports the electron gun 5 remains stationary within the space with respect to the cylindrical sleeves 1 and 2 which pass beneath said gun. The two motors are preferably controlled from the desk 35 which is connected to the motor 103 by the cable 32 and to the motor 23 of the rotator by a lead 111 (shown in FIG. 1). The electron beam 8 thus remains continuously vertical and ensures a uniform weld while making it possible to ensure in particular that the molten weld metal does not solidify in a non-homogeneous manner as would be the case if the electron beam itself were inclined with respect to the vertical. During the relative motion of the cylindrical sleeves with respect to the carriage, the supply cable carried by its supporting chain is unwound within the guide troughs, the loop formed by the cable being intended to occupy variable positions within the chamber 29 of the enclosure as shown diagrammatically in FIG. 8 at $60_1$, $60_2$ and $60_3$.

It will be readily apparent that the welding operation can be performed in one or a number of passes either from the interior or the exterior of the cylindrical sleeves. In fact, if the example of construction which is more especially described and illustrated in FIGS. 1 to 8 refers to an arrangement in which the electron gun support carriage is placed on the external surface of said cylindrical sleeves, it is clearly apparent that provision could be made for the converse arrangement in which the carriage 6 would run on the internal surface of the cylindrical sleeves while remaining motionless within the space at the lower portion of these latter opposite to the junction line 4. In this case, the enclosure would be formed by two lateral plates for closing-off said cylindrical sleeves on the inside whilst the shaped cylindrical strip provided for collecting any possible leakages of the molten weld metal would be placed against the external surface of said cylindrical sleeves in this instance. In this alternative embodiment, the lead-out collar of the electron gun supply cable can be placed at the center of one of the lateral plates by means of a ball-bearing and a sliding seal.

Whatever solution may be adopted, accurate positioning of the beam of the electron gun with respect to the junction line of the cylindrical sleeves remains ensured by means of a curved reference strip located at a distance from a guide rail which has been adjusted beforehand. A floating system for a driving pinion is employed for the relative displacement of the carriage with respect to said rail. It is apparent, however, that consideration could be given to other mechanical systems for following the weld seam to be formed by the electron beam, the essential objective being to maintain perpendicularity of the axis of the electron gun with respect to the plane of the junction line.

Finally and in another alternative embodiment which is adapted in particular to the welding of cylindrical sleeves having small diametral dimensions by means of an electron gun mounted within the interior of said cylindrical sleeves, said electron gun could also be carried by one of the lateral plates of the enclosure by means of a tube which is coaxial with the cylindrical sleeves and passes through said lateral plate while being supported on suitable bearings, vacuum-tightness between the lateral plate and the tube being also ensured by means of a sliding seal or the like at the time of rotation of the cylindrical sleeves. This alternative embodiment makes it possible to simplify certain portions of the device. Thus the secondary pump in particular can be mounted outside the enclosure whilst the bearing point of the electron gun can be transferred to the end of one of the cylindrical sleeves, the guide rail and the driving motor being dispensed with and the electron gun being maintained stationary by means of an auxiliary member located outside said cylindrical sleeve.

What we claim is:

1. A device for electronic beam welding of coaxial cylindrical sleeves placed in end-to-end relation forming a line of junction, comprising:
   carriage means;
   means for moving said carriage means in a circumferential direction along a surface of the cylindrical sleeves in the proximity of the line of junction;
   an electron gun for producing an electron welding beam, said electron gun carried by said carriage means and secured in a position for a substantial radial directing of said beam with respect to the surface along which the carriage means is moved, said electron gun disposed in a pivotal relationship with respect to said carriage means;
   means for continuous fine adjusting of the relative position of said electron gun with respect to said carriage means during movement thereof for fine adjusting of the beam direction in conformance with the location of the line of junction, said continuous fine adjusting means including:
a. a stationary guide rail positionable in relationship with respect to the line of junction;
b. a guide bar adjustably mountable to said stationary guide rail for varying the position of said guide bar with respect to the line of junction, said guide bar positionable in a parallel relationship with respect to and coextensive with the line of junction;
c. a pivoting arm having two ends, one of said ends rigidly fixed to said gun and other of said ends for cooperating with said guide bar for maintaining the beam of said gun in a fixed relationship with respect to said guide bar;
enclosure means for enclosing an area surrounding the line of junction providing a vacuum-tight, sealed enclosure, said area of a size to receive said carriage means permitting movement of the same therewithin; and
means for rotating the cylindrical sleeves in a relatively fixed relationship with respect to each other at a speed of opposite sign and equal magnitude to that of said carriage means for maintaining said carriage means in a relative fixed position with respect to the axis of the sleeves.

2. A welding device according to claim 1, wherein said guide rail includes a portion having a substantially circular transverse cross-section; and further including at least one waisted driving pinion carried by said carriage means for cooperating with said portion; and a drive motor secured to said carriage means, for driving said pinion to displace said carriage means with respect to said guide rail.

3. A welding device according to claim 1 and further including teeth means positioned along said guide rail; and wherein said moving means includes a driving bevel pinion for driving engagement with said teeth.

4. A welding device according to claim 3 wherein said carriage means includes: a substantially horizontal flat flange; pin means set transverse in said flange; a floating device comprising two arms independently pivotally mounted to said pin means, one of said arms supporting said driving pinion;
a roller carried by the other of said arms for making rolling contact with said guide rail; and
a transverse spring for continuously urging said driving pinion and said roller against said guide rail.

5. A welding device according to claim 1 and further including studs positionable at uniform intervals on a sleeve for anchoring of said guide rail to the sleeve.

6. A welding device according to claim 1 wherein said rotating means includes: bearing rollers for cradling the cylindrical sleeves; and a drive motor for driving at least one of said bearing rollers.

7. A welding device according to claim 1 wherein said enclosure means surrounds the external surface of said cylindrical sleeves, said enclosure means includes: two annular half-shells pivotally secured to each other about an axis parallel to the axis of the sleeves when the enclosure means is in position surrounding the external surface of the sleeves, each said half-shell having a substantially U-shaped cross-section and the extremities of the two arms forming the sides of the U-shaped configuration being adapted for application against the surface of the sleeves; and at least one seal carried by said extremities for making sealing contact with the surface of the sleeves.

8. A welding device according to claim 1 wherein said enclosure means includes a shaped cylindrical metallic strip mountable to the surface of the sleeves opposite the surface to which said carriage means is to be moved, said strip for covering the line of junction.

9. A welding device according to claim 8 wherein said metallic strip is formed of a cylindrical ring for vacuum-tight securement against the cylindrical sleeves.

10. a welding device according to claim 8 wherein the edges of said shaped strip are adapted for vacuum-tight securement against said cylindrical sleeves on each side of said junction and said strip has a central portion outset a distance from the sleeves.

11. A welding device according to claim 1 wherein said carriage means comprises:
a frame;
wheel means carried by said frame for movement along the surface of the cylindrical sleeves;
a support bracket rigidly fixed to said frame;
a vacuum-tight casing pivotally mounted to said support bracket, said casing carrying said electron gun;
a diffusion pump carried by said casing for creating a vacuum; and
means communicating said casing with said gun for creating a vacuum therewithin.

12. A welding device according to claim 11 and further including means for adjusting the height of said frame with respect to said wheel means.

13. A welding device according to claim 1 and further including roller means mounted to said other end of said pivot arm, said roller means for making rolling contact with said guide bar for providing said cooperating of said other end with said guide bar.

14. A welding device according to claim 13 wherein said roller means is spring-biased against said guide bar.

15. A welding device according to claim 1 wherein said guide bar is securable to the surface of one of the sleeves.

16. A device for electronic beam welding of coaxial cylindrical sleeves placed in end-to-end relation forming a line of junction, comprising:
carriage means;
means for moving said carriage means in a circumferential direction along a surface of the cylindrical sleeves in the proximity of the line of junction;
an electron gun for producing an electron welding beam, said electron gun carried by said carriage means and secured in a position for a substantial radial directing of said beam with respect to the surface along which the carriage means is moved;
means for continuous fine adjusting of the relative position of said electron gun with respect to said carriage means during movement thereof for fine adjusting of the beam direction in conformance with the location of the line of junction;
enclosure means for enclosing an area surrounding the line of junction providing a vacuum-tight, sealed enclosure, said area of a size to receive said carriage means permitting movement of the same therewithin;
cable means connected to said gun, said cable means having a length within said enclosure means of slightly greater than half-circumference of one of the sleeves;
lead-out, opening connection means disposed in said enclosure means for vacuum-tight passing of said cable means outside of said enclosure means;

annular guide means disposed within said enclosure means for supporting said cable means;

an articulated chain means secured to the portion of said cable means disposed within said enclosure means, for carrying said cable means; and means for rotating the cylindrical sleeves in a relatively fixed relationship with respect to each other at a speed of opposite sign and equal magnitude to that of said carriage means for maintaining said carriage means in a relative fixed position with respect to the axis of the sleeves.

17. A welding device according to claim 16 wherein said enclosure means surrounds the external surface of said cylindrical sleeves, said enclosure means includes:

two annular half-shells pivotally secured to each other about an axis parallel to the axis of the sleeves when the enclosure means is in position surrounding the external surface of the sleeves, each said half-shell having a substantially U-shaped cross-section and the extremities of the two arms forming the sides of the U-shaped configuration being adapted for application against the surface of the sleeves; and at least one seal carried by said extremities for making sealing contact with the surface of the sleeves.

18. A welding device according to claim 16 wherein said enclosure means includes a shaped cylindrical metallic strip mountable to the surface of the sleeves opposite the surface to which said carriage means is to be moved, said strip for covering the line of junction.

19. A welding device according to claim 16 wherein said carriage means comprises:
 a frame;
 wheel means carried by said frame for movement along the surface of the cylindrical sleeves;
 a support bracket rigidly fixed to said frame;
 a vacuum-tight casing pivotally mounted to said support bracket, said casing carrying said electron gun;
 a diffusion pump carried by said casing for creating a vacuum; and
 means communicating said casing with said gun for creating a vacuum therewithin.

20. A welding device according to claim 16 wherein said electron gun is disposed in a pivotal relationship with respect to said carriage means; and wherein said continuous fine adjusting means includes:
 a curved guide bar positionable in a parallel relationship with respect to and coextensive with the line of junction;
 a pivoting arm having two ends, one of said ends rigidly fixed to said gun and other of said ends for cooperating with said guide bar for maintaining the beam of said gun in a fixed relationship with respect to said guide bar.

21. A welding device according to claim 20 and further including roller means mounted to said other end of said pivot arm, said roller means for making rolling contact with said guide bar for providing said cooperating of said other end with said guide bar.

22. A welding device according to claim 21 wherein said roller means is spring-biased against said guide bar.

23. A welding device according to claim 20 wherein said guide bar is securable to the surface of one of the sleeves.

24. A welding device according to claim 20 wherein said moving means includes drive means secured to said carriage means and cooperating with said guide bar for moving said carriage means with respect to said guide bar.

25. A welding device according to claim 20 and further including a stationary guide rail for carrying said guide bar, said guide bar adjustably mountable with respect to said stationary guide rail for varying the position of said guide bar with respect to the line of junction.

26. A welding device according to claim 24 and further including: a stationary guide rail for carrying said guide bar, said guide rail including a portion having a substantially circular transverse cross-section; at least one waisted driving pinion carried by said carriage means for cooperating with said portion; and a drive motor for driving said pinion to displace said carriage means with respect to said guide rail.

27. A welding device according to claim 24 and further including: a stationary guide rail for carrying said guide bar; teeth means positioned along said guide rail; and wherein said moving means includes a driving bevel pinion for driving engagement with said teeth.

28. A welding device according to claim 27 wherein said carriage means includes: a substantially horizontal flat flange; pin means set transverse in said flange; a floating device comprising two arms independently pivotally mounted to said pin means, one of said arms supporting said driving pinion;
 a roller carried by the other of said arms for making rolling contact with said guide rail; and
 a transverse spring for continuously urging said driving pinion and said roller against said guide rail.

29. A welding device according to claim 25 and further including studs positionable at uniform intervals on a sleeve for anchoring of said guide rail to the sleeve.

30. A welding device according to claim 16 wherein said rotating means includes: bearing rollers for cradling the cylindrical sleeves; and a drive motor for driving at least one of said bearing rollers.

31. A device for electronic beam welding of coaxial cylindrical sleeves placed in end-to-end relation forming a line of junction, comprising:
 carriage means;
 means for moving said carriage means in a circumferential direction along a surface of the cylindrical sleeves in the proximity of the line of junction;
 an electron gun for producing an electron welding beam, said electron gun carried by said carriage means and secured in a position for a substantial radial directing of said beam with respect to the surface along which the carriage means is moved, said electron gun disposed in a pivotal relationship with respect to said carriage means;
 means for continuous fine adjusting of the relative position of said electron gun with respect to said carriage means during movement thereof for fine adjusting of the beam direction in conformance with the location of the line of junction, said continuous fine adjusting means including:
  a. a curved guide bar positionable in a parallel relationship with respect to and coextensive with the line of junction;
  b. a pivoting arm having two ends, one of said ends rigidly fixed to said gun and other of said ends for cooperating with said guide bar for maintaining the beam of said gun in a fixed relationship with respect to said guide bar;
 enclosure means for enclosing an area surrounding the line of junction providing a vacuum-tight, sealed enclosure, said area of a size to receive said carriage means permitting movement of the same therewithin; and means for rotating the cylindrical sleeves in a relatively fixed relationship with respect to each other at a speed of opposite sign and equal magnitude to that of said carriage means for maintaining said carriage means in a relative fixed position with respect to the axis of the sleeves.

32. A welding device according to claim 31 and further including roller means mounted to said other end of said pivot arm, said roller means for making rolling contact with said guide bar for providing said cooperating of said other end with said guide bar.

33. A welding device according to claim 32 wherein said roller means is spring-biased against said guide bar.

34. A welding device according to claim 31 wherein said guide bar is securable to the surface of one of the sleeves.

35. A welding device according to claim 31 wherein said moving means includes drive means secured to said carriage means and cooperating with said guide bar for moving said carriage means with respect to said guide bar.

* * * * *